United States Patent
Chen et al.

(10) Patent No.: US 11,010,338 B2
(45) Date of Patent: May 18, 2021

(54) DATA SCREENING DEVICE AND METHOD

(71) Applicant: Shanghai Cambricon Information Technology Co., Ltd, Pudong New Area (CN)

(72) Inventors: Tianshi Chen, Pudong New Area (CN); Yifan Hao, Pudong New Area (CN); Zai Wang, Pudong New Area (CN); Shaoli Liu, Pudong New Area (CN)

(73) Assignee: Shanghai Cambricon Information Technology Co., Ltd, Pudong New Arena (CN)

( * ) Notice: Subject to any disclaimer, the term of this patent is extended or adjusted under 35 U.S.C. 154(b) by 0 days.

(21) Appl. No.: 16/520,082

(22) Filed: Jul. 23, 2019

(65) Prior Publication Data

US 2019/0347543 A1 Nov. 14, 2019

Related U.S. Application Data

(63) Continuation of application No. 16/283,711, filed on Feb. 22, 2019, now Pat. No. 10,896,369, which is a continuation-in-part of application No. PCT/CN2018/081929, filed on Apr. 4, 2018.

(30) Foreign Application Priority Data

Apr. 4, 2018 (CN) .......................... 201710222232.5

(51) Int. Cl.
*G06F 16/16* (2019.01)
*G06F 9/38* (2018.01)
*G06F 9/30* (2018.01)
*G06N 3/063* (2006.01)

(52) U.S. Cl.
CPC ........ *G06F 16/162* (2019.01); *G06F 9/30083* (2013.01); *G06F 9/3802* (2013.01); *G06F 9/30025* (2013.01); *G06N 3/063* (2013.01)

(58) Field of Classification Search
CPC .. G06F 17/16; G06F 9/30025; G06F 9/30083; G06F 9/3802; G06F 16/162
See application file for complete search history.

(56) References Cited

U.S. PATENT DOCUMENTS

| 5,931,945 A | 8/1999 | Yung et al. |
| 6,038,580 A | 3/2000 | Yeh |
| 6,330,657 B1 | 12/2001 | Col et al. |
| 9,435,315 B2 | 9/2016 | Kalnay |

(Continued)

FOREIGN PATENT DOCUMENTS

| CN | 100586092 C | 1/2010 |
| CN | 201726420 U | 1/2011 |

(Continued)

OTHER PUBLICATIONS

PCT/CN2018081929, Search Report, dated May 30, 2018, 10 pages. (No English Translation).

(Continued)

*Primary Examiner* — Truong V Vo
(74) *Attorney, Agent, or Firm* — Getech Law LLC; Jun Ye (57) ABSTRACT

The present disclosure provides a data screening device and method, which employ a storage unit and a register unit, and are capable of performing operations on data of different storage structures and different sizes efficiently.

29 Claims, 4 Drawing Sheets

(56) References Cited

U.S. PATENT DOCUMENTS

| | | | |
|---|---|---|---|
| 2002/0027552 A1 | 3/2002 | Lee | |
| 2003/0061547 A1* | 3/2003 | Bartling | H04L 49/90 |
| | | | 714/43 |
| 2003/0088600 A1 | 5/2003 | Lao et al. | |
| 2004/0236920 A1 | 11/2004 | Sheaffer et al. | |
| 2010/0075645 A1* | 3/2010 | Yamamura | H04W 4/029 |
| | | | 455/415 |
| 2014/0081893 A1 | 3/2014 | Modha | |
| 2014/0278126 A1 | 9/2014 | Adelman et al. | |
| 2014/0365967 A1* | 12/2014 | Fan | G06F 16/9038 |
| | | | 715/825 |
| 2015/0356054 A1 | 12/2015 | Barak et al. | |

FOREIGN PATENT DOCUMENTS

| | | | |
|---|---|---|---|
| CN | 102508803 A | 6/2012 | |
| CN | 102930336 A | 2/2013 | |
| CN | 104216922 B | 12/2014 | |
| CN | 104641385 B | 5/2015 | |
| CN | 104750758 A | 7/2015 | |
| CN | 104836822 A | 8/2015 | |
| CN | 105426160 A | 3/2016 | |
| CN | 105512723 B | 4/2016 | |
| CN | 105844330 B | 8/2016 | |
| CN | 105930902 A | 9/2016 | |
| CN | 106066783 A | 11/2016 | |
| CN | 106155946 A | 11/2016 | |
| CN | 106371972 A | 2/2017 | |
| CN | 106227507 B | 10/2019 | |
| EP | 3624018 A1 | 4/2018 | |
| EP | 3633526 A1 | 4/2018 | |
| WO | 2016099779 A1 | 6/2016 | |

OTHER PUBLICATIONS

CN201710266052.7, Office Action, dated May 8, 2020, 10 pages. (No English Translation).

Lazzizzera, et al.,Fast and Compact Controllers with Digital Neural Networks, Instrumentation and Measurement Technology Conference, 1997, pp. 226-231, IEEE.

CN201710227493.6, Office Action, dated Jan. 5, 2021, 9 pages. (No English Translation).

CN201710227493.6, Office Action, dated Apr. 23, 2020, 10 pages. (No English Translation).

CN201710222232.5, Office Action, dated Apr. 10, 2020, 9 pages. (No English Translation).

CN201710222232.5, Office Action, dated Dec. 1, 2020, 5 pages. (No English Translation).

CN201710256444.5, Office Action, dated Jan. 2, 2020, 11 pages. (No English Translation).

CN201710256444.5, Office Action, dated Aug. 5, 2020, 9 pages. (No English Translation).

CN201710312415.6, Office Action, dated May 8, 2020, 10 pages. (No English Translation).

EP19199524.0, Reply to Search Opinion/Written Opinion/IPER filed Sep. 9, 2020, 61 pages.

EP19199524.0, Communication Pursuant to Article 94(3) dated Dec. 21, 2020, 9 pages Donovan, et al., "Pixel Processing in a Memory Controller", 8222 IEEE Computer Graphics and Applications, Jan. 15, 1995, No. 1, 11 pages.

19 199 526.5-1231, Communication Pursuant to Article 94(3) dated Jan. 14, 2021, 10 pages.

Zekri, Restructuring and Implementations of 2D Matrix Transpose Algorithm Using SSE4 Vector Instructions, 2015, IEEE, 7 pages.

Shahbahrami, et al., Matrix Register File and Extended Subwords: Two Techniques for Embedded Media Processors, 2005, ACM, 9 pages.

EP19199526.5, Reply to Search Opinion/Written Opinion/IPER dated Oct. 2, 2020, 45 pages.

19199526.5-1231, Extended European Search Report, dated Mar. 5, 2020, 10 pages.

19 199 528.1-1203, Communication Pursuant to Article 94(3) dated Nov. 13, 2020, 8 pages.

18 780 474.5-1203, Communication Pursuant to Article 94(3) dated Nov. 25, 2020, 7 pages.

18 780 474.5-1203, Reply to Examination Report dated Oct. 12, 2020, 167 pages.

18780474.5-1203, Extended European Search Report, dated Feb. 24, 2020, 4 pages.

Qiu, et al., Going Deeper with Embedded FPGA Platform for Convolutional Neural Network, 2016,10 pages, ACM.

* cited by examiner

DATA SCREENING DEVICE AND METHOD

TECHNICAL FIELD

The present disclosure relates to the technical field of artificial neural network, and more particularly to a data screening device and method.

BACKGROUND

Many algorithms in the field of computing involve data screening. Taking image processing as an example, images are stored in a computer in matrix, and each value in the matrix corresponds to the grayscale of a pixel. To process certain pixels of an image, a screening is required to be done to select those pixels prior to the processing. When many images exist in a database with each image having numerous pixels, the amount of data would be very large. Therefore, it is very important to screen data efficiently.

A known solution of performing data screening in the prior art is to use a general-purpose processor, that is, operations related to data screening are performed by a general register file and a general function component executing a general instruction. Disadvantages of the solution include that the performance of a single general-purpose processor is relatively low, and that when employing a plurality of general-purpose processors to execute instructions in parallel, the communication between the general-purpose processors may be a performance bottleneck.

SUMMARY

(I) Technical Problem to be Solved

In view of the above-mentioned situation, the present disclosure provides a data screening device and method to overcome the problems of data screening in the prior art, which are the limitations due to the performance of a single processor, the communication between several processors, and the like.

(II) Technical Solutions

An aspect of the present disclosure provides a data screening device including:
a storage unit for storing data;
a register unit for storing data address of the data in the storage unit;
a data screening module for acquiring the data address from the register unit, acquiring corresponding data from the storage unit according to the data address, and screening the acquired data to obtain a data screening result.

In some embodiments, the data screening module may include a data screening unit for screening the acquired data.

In some embodiments, the data screening module may further include: an I/O unit, an input data buffer unit, and an output data buffer unit;
the I/O unit may be configured to transfer the data stored in the storage unit to the input data buffer unit;
the input data buffer unit may be configured to store the data transferred by the I/O unit;
the data screening unit may be configured to take data transferred from the input data buffer unit as input data, screen the input data, and transfer output data to the output data buffer unit;
the output data buffer unit may be configured to store the output data.

In some embodiments, the input data may include data to be screened and location information data, and the output data may include screened data, or screened data and relevant information of the screened data.

In some embodiments, the data to be screened may be a vector or an array, the location information data may be a binary code, a vector or an array; and the relevant information may include vector length, array size, and occupied space.

In some embodiments, the data screening unit may be configured to scan each component of the location information data; if the component is 0, a component of the data to be screened corresponding to the component may be deleted; if the component is 1, a component of the data to be screened corresponding to the component may be retained. Or, if the component is 1, a component of the data to be screened corresponding to the component may be deleted; if the component is 0, a component of the data to be screened corresponding to the component may be retained. After the scan, the screened data may be obtained and output.

In some embodiments, the data screening module may further include a structural deformation unit, which may be configured to deform the storage structure for the input data and/or output data.

The other aspect of the present disclosure provides a method for data screening by the data screening device including:
Step A: acquiring data address from the register unit by the data screening module;
Step B: acquiring corresponding data from the storage unit according to the data address; and
Step C: screening the acquired data to obtain a data screening result.

In some embodiments, the Step A may include: acquiring address of data to be screened and address of location information data from the register unit by the data screening unit;
the Step B may include:
Sub-step B1: transmitting, by the I/O unit, the data to be screened and the location information data in the storage unit to the input data buffer unit;
Sub-step B2: transferring, by the input data buffer unit, the data to be screened and the location information data to the data screening unit;
the Step C may include: screening, by the data screening unit, the data to be screened according to the location information data and transferring output data to the output data buffer unit.

In some embodiments, between the Sub-step B1 and the Sub-step B2, the method may further include:
determining whether or not to deform a storage structure; if the storage structure is required to be deformed, performing Sub-step B3; if the storage structure does is not required to be deformed, performing Sub-step B2 directly;
Sub-step B3: transferring, by the input data buffer unit, the data to be screened to the structural deformation unit which may be configured to deform the storage structure, and return deformed data to be screened to the input data buffer unit; and then performing Sub-step B2.

(III) Technical Effect

It can be learnt from the above technical solutions that a data screening device and method according to the present disclosure may have the following technical effect:
by temporarily storing data and instructions involved in a screening operation on a dedicated buffer, a data screening operation on data of different storage structures and different sizes may be performed more efficiently.

BRIEF DESCRIPTION OF THE DRAWINGS

The drawings are intended to facilitate further understanding of the present disclosure and constitute a part of the specification, and, together with the embodiments below, serve to explain the present disclosure, rather than limit the present disclosure. In the drawings.

DETAILED DESCRIPTION

To facilitate the understanding of the object, technical solutions, and advantages of the present disclosure, the present disclosure will be further described in detail below with reference to the specific embodiments and drawings.

It should be noted that in the drawings or the description of the specification, the similar reference numbers are used for similar or identical parts. Implementing modes not shown or described in the drawings are known to those of ordinary skill in the art. Additionally, although examples including parameters of specific values may be provided herein, it should be understood that the parameters are not necessarily exactly equal to the corresponding values, but may approximate the corresponding values within acceptable tolerances or design constraints. The directional terms mentioned in the embodiments, such as "upper", "lower", "front", "back", "left", "right", etc., only refer to the directions in the drawings. Therefore, the directional terms here are used to describe, rather than limit, the scope of protection of the present disclosure.

Figure 1:
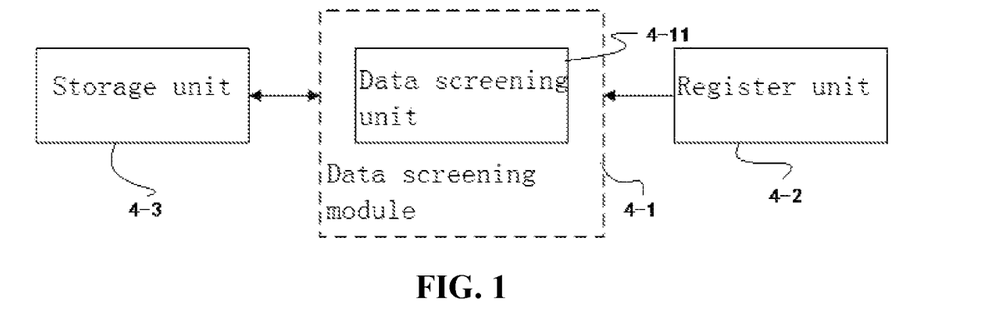
FIG. 1 is an overall structural diagram for a data screening device according to an embodiment of the present disclosure.

An embodiment of the present disclosure provides a data screening device, as shown in FIG. 1, including: a storage unit 4-3 for storing data and instructions, where the data may include data to be screened and location information data;

a register unit 4-2 for storing data address of the data in the storage unit;

a data screening module 4-1 including a data screening unit 4-11, the data screening module may acquire a data address from a register unit according to the instruction, acquire corresponding data from the storage unit according to the data address, and perform a screening operation according to the acquired data to obtain a data screening result.

Figure 2:
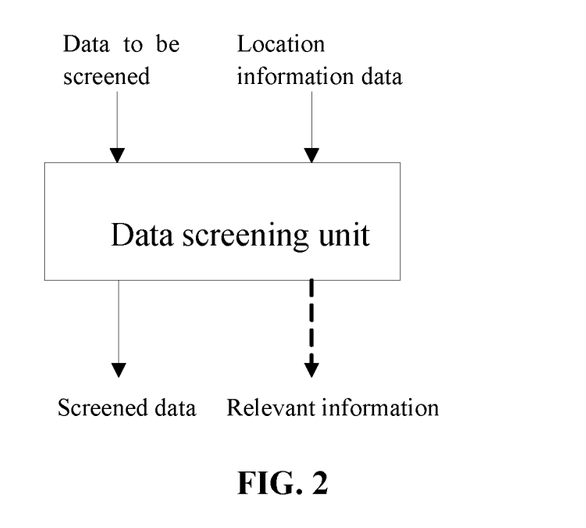
FIG. 2 is a functional diagram for a data screening unit according to an embodiment of the present disclosure.

FIG. 2 shows the schematically functional diagram of the data screening unit. Input data of the data screening unit may be data to be screened and location information data, and output data of the data screening unit may only include screened data, or may include relevant information of the screened data at the same time. The relevant information may be vector length, array size, occupied space, etc.

Figure 3:
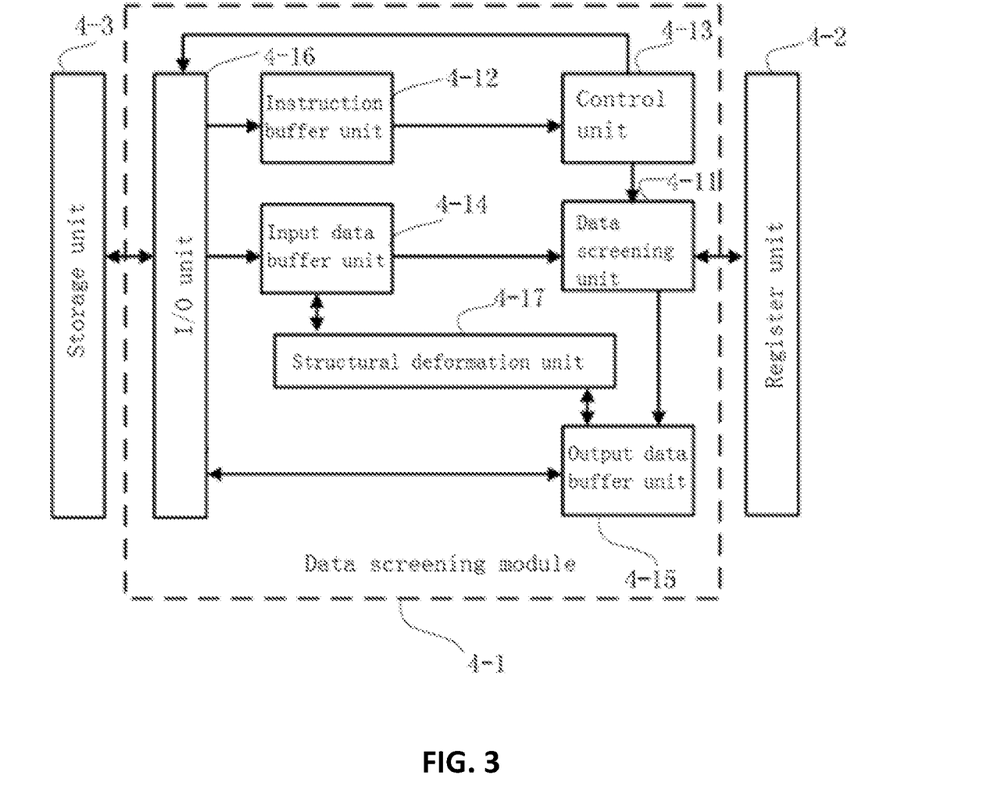
FIG. 3 is specific structural diagram for a data screening device according to an embodiment of the present disclosure.

Furthermore, as shown in FIG. 3, the data screening device of the present embodiment may specifically include:

a storage unit 4-3 for storing data to be screened, location information data, and instructions;

a register unit 4-2 for storing data address of the data in the storage unit;

a data screening module 4-1 including:

an instruction buffer unit 4-12 for storing instructions;

a control unit 4-13 for reading the instructions from the instruction buffer unit, and decoding the instructions into specific operational microinstructions;

an I/O unit 4-16 for transferring the instructions in the storage unit to the instruction buffer unit, transferring the data in the storage unit to an input data buffer unit and an output buffer unit, and transferring output data in the output buffer unit to the storage unit;

an input data buffer unit 4-14 for storing data transferred by the I/O unit including data to be screened and location information data;

a data screening unit 4-11 for receiving microinstructions sent by the control unit, and acquiring a data address from the register unit, serving the data to be screened and the location information data sent by the input data buffer unit as input data, performing a screening operation on the input data, and after the screening operation is completed, transmitting screened data to the output data buffer unit;

an output data buffer unit 4-15 for storing output data, the output data may only include screened data, or may also include relevant information, such as vector length, array size, occupied space, of the screened data at the same time.

The data screening device of the present embodiment may be suitable for a plurality of screening objects. The data to be screened may be vectors, high-dimensional arrays, or the like. The location information data may be binary codes, and may also be vectors, high-dimensional arrays, or the like, in which each component is 0 or 1. Among them, components of the data to be screened and components of the location information data may be of one-to-one correspondence. It should be understood by those skilled in the art that each component of the location information data being 1 or 0 is merely an exemplary way of expressing location information, but expression of the location information is not limited to this way.

Alternatively, when each component in the location information data is 0 or 1, the screening the input data by the data screening unit may include: scanning each component of the location information data by the data screening unit; if the component is 0, a component of the data to be screened corresponding to the component may be deleted; if the component is 1, a component of the data to be screened corresponding to the component may be retained; or, if the component of the location information data is 1, a component of the data to be screened corresponding to the component may be deleted, if the component is 0, a component of the data to be screened corresponding to the component may be retained. When the scanning is completed, the screening is completed, and the screened data are obtained and output. In addition, while the screening operation is performed, the relevant information of the screened data may also be recorded, such as vector length, array size, occupied space; and whether or not the relevant information should be synchronously recorded and output may depend on specific circumstances. It should be noted that, when each component of the location information data is expressed by other ways of expression, the data screening unit may also configure a screening operation corresponding to the way of expression.

The process of data screening is explained below by examples.

Example I

Supposing the data to be screened is a vector (1 0 101 34 243), and the components less than 100 are required to be screened, then the input location information data is also a vector, i.e., vector (1 1 0 1 0). The screened data can still be retained in the vector structure, and the vector lengths of the screened data can be output simultaneously.

The location information vector may be externally input or internally generated. Optionally, the device of the present disclosure may further include a location information generating module, which may be configured to generate a location information vector, where the location information generating module may be connected to the data screening unit. Specifically, the location information generating module may generate the location information vector by a vector computation, where the vector computation may be a vector comparison computation, in other words, the components of the vector to be screened may be compared with a predefined value one by one. It should be noted that the location information generating module may further choose other vector computations to generate the location information vector according to predefined conditions. In this example, it is prescribed that if the component of the location information data is 1, a corresponding component in the data to be screened may be retained, if the component is 0, a corresponding component in the data to be screened may be deleted.

The data screening unit may initialize a variable length=0 for recording the vector length of the screened data;

the data screening unit may read the data in the input data buffer unit, scan a first component of the location information vector and find a value of the first component to be 1, so the first component of the vector to be screened, with a value of 1, may be retained, length=length+1;

the data screening unit may scan a second component of the location information vector and find a value of the second component value to be 1, so the second component of the vector to be screened, with a value of 0, may be retained, length=length+1;

the data screening unit may scan a third component of the location information vector and find a value of the third component to be 0, so the third component of the vector to be screened with a value of 101 may be deleted, where the length may be unchanged;

the data screening unit may scan a fourth component of the location information vector and find a value of the fourth component to be 1, so the fourth component of the vector to be screened with a value of 34 may be retained, length=length+1;

the data screening unit may scan a fifth component of the location information vector and find a value of the fifth component to be 0, so the fifth component of the vector to be screened with a value of 243 may be deleted, where the length may be unchanged;

The retained values form a screened vector (1 0 34) and its vector length is length=3, which is stored in an output buffer unit.

In the data screening device of this embodiment, the data screening module may further include a structural deformation unit 4-17, which may deform storage structures of the input data in the input data buffer unit and the output data in the output data buffer unit, for example, a high-dimensional array is expanded to a vector, or a vector is changed into a high-dimensional array, or the like. Optionally, the method of expanding the high-dimensional data may be in a row-major order or a column-major order, and other expansion methods may be selected according to specific situations.

Example II

Supposing the data to be screened is a four-dimensional array $$\begin{pmatrix} 1 & 4 \\ 61 & 22 \end{pmatrix},$$

and values to be screened are even values, then the input location information array is $$\begin{pmatrix} 0 & 1 \\ 0 & 1 \end{pmatrix},$$

and the screened data is of a vector structure and no relevant information is output. The present example prescribes that if the component of the location information data is 1, a corresponding component in the data to be screened may be retained, and if the component is 0, a corresponding component of the data to be screened may be deleted.

The data screening unit may read data in the input data buffer unit, scan a (1,1)-th component of the location information array and find its value to be 0, so the (1,1)-th component of the array to be screened with a value of 1 may be delete;

the data screening unit may scan a (1,2)-th component of the location information array and find its value to be 1, so the (1,2)-th component of the array to be screened with a value of 4 may be retained;

the data screening unit may scan a (2,1)-th component of the location information array and find its value to be 0, so the (2,1)-th component of the array to be screened with a value of 61 may be deleted;

the data screening unit may scan a (2,2)-th component of the location information array and find its value to be 1, so of the (2,2)-th component of the array to be screened with a valued of 22 may be retained;

The structural deformation unit may turn the retained values into a vector, i.e., the screened data is a vector (4 22), and is stored in an output data buffer unit.

Figure 4:
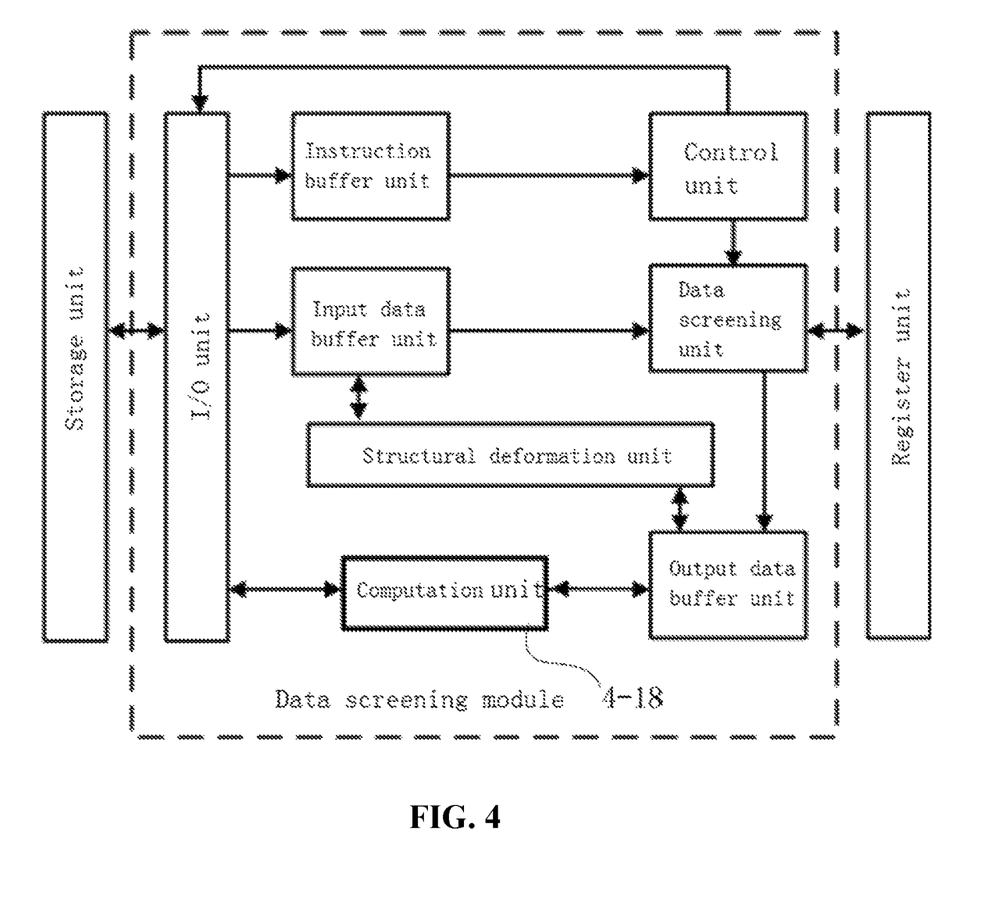
FIG. 4 is another specific structural diagram for a data screening device according to an embodiment of the present disclosure.

In some embodiments, as shown in FIG. 4, the data screening module may further include: a computing unit 4-18. Therefore, the device of the present disclosure can achieve data screening and processing simultaneously, in other words, a data screening and processing device can be obtained. The specific structure of the computing unit may be the same as that in the foregoing embodiments, and details are not repeated herein.

The present disclosure provides a method for performing data screening by the data screening device including:

acquiring data address from a register unit by a data screening module;

acquiring corresponding data from a storage unit according to the data address; and screening the acquired data to obtain a data screening result.

In some embodiments, the acquiring data address from the register unit by the data screening module includes: acquiring the address of the data to be screened and the address of the location information data from the register unit by the data screening unit.

In some embodiments, the acquiring corresponding data from the storage unit according to the data address includes the following sub-steps:

transmitting, by an I/O unit, the data to be screened and the location information data in the storage unit to an input data buffer unit; and transferring, by the input data buffer unit, the data to be screened and the location information data to the data screening unit.

Optionally, between the sub-step of transmitting, by the I/O unit, the data to be screened and the location information data in the storage unit to the input data buffer unit and the sub-step of transferring, by the input data buffer unit, the data to be screened and the location information data to the data screening unit, the sub-steps further includes: determining whether or not to deform a storage structure.

If the storage structure is required to be deformed, the input data buffer unit transmits the data to be screened to the structural deformation unit, the structural deformation unit deforms the storage structure, and transmits the deformed data to be screened back to the input data buffer unit; and then the sub-step of transferring, by the input data buffer unit, the data to be screened and the location information data to the data screening unit is executed. If the storage structure is not required to be deformed, the sub-step of transferring, by the input data buffer unit, the data to be screened and the location information data to the data screening unit is directly executed.

In some embodiments, the step of screening the acquired data to obtain the data screening result includes: screening, by the data screening unit, the data to be screened according to the location information data, and transmitting the output data to the output data buffer unit.

Figure 5:
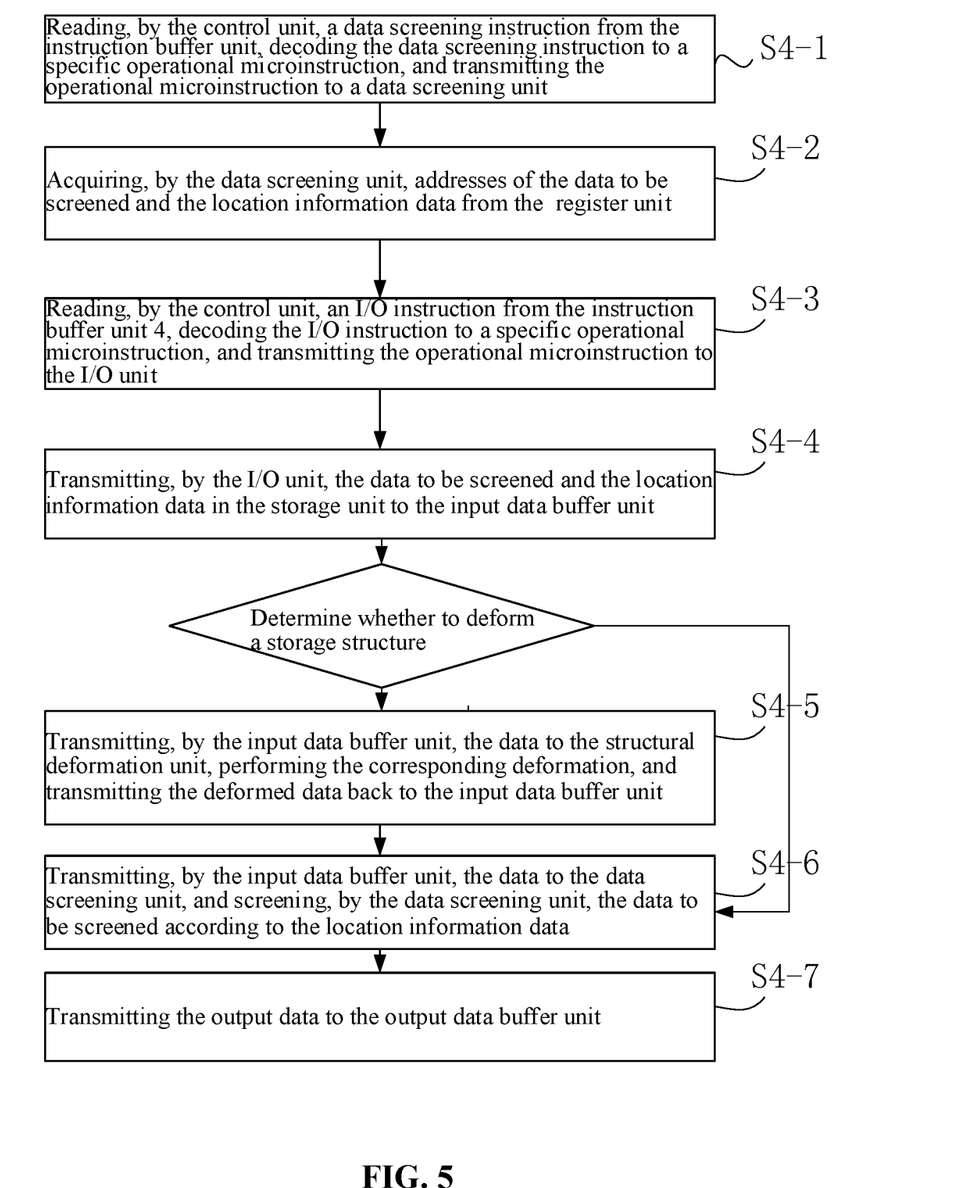
FIG. 5 is a flow chart of a data screening method according to an embodiment of the present disclosure.

As shown in FIG. 5, in one specific embodiment of the present disclosure, the method for data screening may specifically include:

Step S4-1: reading, by the control unit, a data screening instruction from the instruction buffer unit, decoding the data screening instruction to a specific operational microinstruction, and transmitting the operational microinstruction to the data screening unit;

Step S4-2: acquiring, by the data screening unit, addresses of the data to be screened and location information data from the register unit;

Step S4-3: reading, by the control unit, an I/O instruction from the instruction buffer unit, decoding the I/O instruction to a specific operational microinstruction, and transmitting the operational microinstruction to the I/O unit;

Step S4-4: transmitting, by the I/O unit, the data to be screened and the location information data in the storage unit to the input data buffer unit;

determining whether or not to deform a storage structure; if the storage structure is required to be deformed, performing Step S4-5; if the storage structure is not required to be deformed, directly performing Step S4-6;

Step S4-5: transmitting, by the input data buffer unit, the data to the structural deformation unit, performing the corresponding storage structure deformation, and then transmitting the deformed data back to the input data buffer unit, then proceeding to Step S4-6;

Step S4-6: transmitting, by the input data buffer unit, the data to the data screening unit, and screening, by the data screening unit, the data to be screened according to the location information data;

Step S4-7: transmitting output data to the output data buffer unit, where the output data may only include screened data, or may also include relevant information, e.g., vector length, array size, and occupied space, of the screened data at the same time.

So far the embodiments of the present disclosure have been described in detail in conjunction with the drawings. Based on the above description, those skilled in the art should have a clear understanding of a data screening device and method of the present disclosure.

Heretofore, the embodiments of the present disclosure have been described in detail in conjunction with the drawings. Based on the above description, those skilled in the art should have a clear understanding of a data screening device and method of the present disclosure.

In some embodiments, the present disclosure provides a chip including the above data screening device.

In some embodiments, the present disclosure further provides a chip package structure including the above chip.

In some embodiments, the present disclosure further provides a board including the above chip package structure.

In some embodiments, the present disclosure further provides an electronic device including the above board.

The electronic device may include a data processing device, a robot, a computer, a printer, a scanner, a tablet, a smart terminal, a mobile phone, a driving recorder, a navigator, a sensor, a camera, a server, a cloud server, a camera, a video camera, a projector, a watch, an earphone, a mobile storage, a wearable device, a transportation, a household appliance, and/or a medical facility.

The transportation includes an airplane, a ship, and/or a vehicle. The household appliance includes a television set, an air conditioner, a microwave oven, a refrigerator, a rice cooker, a humidifier, a washing machine, an electric lamp, a gas stove, and a range hood. The medical device includes a nuclear magnetic resonance instrument, a B-ultrasound machine, and/or an electrocardiograph.

It should be noted that, for the sake of brevity, the foregoing method embodiments are all described as a combination of a series of actions, but those skilled in the art should understand that the present disclosure is not limited by the described sequence of actions, because certain steps may be performed in other sequences or concurrently in accordance with the present disclosure. Furthermore, those skilled in the art should also understand that the embodiments described in the specification are all optional embodiments, and the actions and modules involved are not necessarily required by the present disclosure.

The above various embodiments are described with different focuses, and the parts that are not detailed in a certain embodiment can be found in the related descriptions of other embodiments.

In the several embodiments provided herein, it should be understood that the disclosed device may be implemented in other ways. For example, the device embodiments described above are merely illustrative. For example, the division of the units is only a logical functional division. In actual implementations, there may be other dividing manners, for example, combining multiple units or components or integrating them into another system, or ignoring or not executing some features. In addition, the mutual coupling or direct coupling or communication connection shown or discussed may be indirect coupling or communication connection through some interfaces, devices or units, and may be in an electrical form or other forms.

The units described as separate components may or may not be physically separated, and the components presented as units may or may not be physical units; that is, they may be located in one place, or may be distributed to multiple network units. Some or all of the units may be selected according to actual needs to achieve the purpose of the technical solution of the embodiment.

In addition, the respective functional units in the respective embodiments of the present disclosure may be integrated into one processing unit, or each unit may exist in a physically independent manner, or two or more units may be integrated in one unit. The above integrated unit can be implemented in the form of hardware or in the form of a software program module.

The integrated unit, if implemented in the form of a functional software unit and sold or used as a standalone product, may be stored in a computer readable memory. Based on such understanding, the essence of the technical solution of the present disclosure or the part of the technical solution which makes a contribution to the prior art or the whole or part of the technical solution may be embodied in the form of a software product. The computer software product is stored in a memory which includes a number of instructions for causing a computer device (which may be a personal computer, server or network device, etc.) to perform all or some of the steps of the method described in each embodiment of the present disclosure. The foregoing memory includes various media that can store program codes, such as USB stick, Read-Only Memory (ROM), Random Access Memory (RAM), removable hard disk, magnetic disk, CD, and the likes.

Those skilled in the art may understand that all or some of the steps in the methods of the above embodiments can be completed with related hardware instructed by a program. The program can be stored in a computer readable memory. The memory may include: flash disk, Read-Only Memory (ROM), Random Access Memory (RAM), magnetic disk, CD, and the likes.

The above description of the disclosed embodiments enables those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not limited to the embodiments shown herein, but satisfies the broadest scope consistent with the principles and novel features disclosed herein.

It should be noted that the implementations that are not shown or described in the drawings or the description are all known to those skilled in the art, and are not described in detail. In addition, the above definitions of the various elements and methods are not limited to the specific structures, shapes or manners mentioned in the embodiments, and modifications and alternation can be readily conceived by those skilled in the art.

The foregoing embodiments further explain the objective, the technical solution, and the advantageous effects of the present disclosure. It is appreciated that the foregoing is merely specific embodiments of the present disclosure, and is not intended to be limiting. Any modification, equivalent substitution, improvements, etc. made within the spirit and principles of the present disclosure shall be included in the scope of the present disclosure.

What is claimed is:

1. A data screening device, comprising:
a storage unit configured to store data,
a register unit configured to store data address of the data in the storage unit;
a data screening module configured to:
acquire the data address from the register unit,
acquire the data from the storage unit according to the data address,
wherein the acquired data includes location information data and data to be screened,
wherein the location information data includes one or more location components that respectively correspond to one or more components included in the data to be screened, and
wherein each of the location components indicates whether a corresponding one of the one or more components in the data to be screened will be deleted,
and
screen the acquired data to obtain a data screening result based on the location information data by removing at least one of the one or more components in the data to be screened that are indicated to be deleted by the location components.

2. The data screening device of claim 1, wherein the data screening module includes a data screening unit configured to screen the acquired data.

3. The data screening device of claim 2, wherein the data screening module further includes: an I/O unit, an input data buffer unit, and an output data buffer unit,
wherein the I/O unit is configured to transfer the data stored in the storage unit to the input data buffer unit,
wherein the input data buffer unit is configured to store the data transferred by the I/O unit,
wherein the data screening unit is configured to take data transferred from the input data buffer unit as input data, screen the input data to generate output data, and transfer the output data to the output data buffer unit, and
wherein the output data buffer unit is configured to store the output data.

4. The data screening device of claim 3, wherein the input data includes the data to be screened and the location information data, and wherein the output data includes the data screening result and relevant information of the the data screening result.

5. The data screening device of claim 4,
wherein the data to be screened is a vector,
wherein the location information data is a binary code, and
wherein the relevant information includes vector length, array size, and occupied space.

6. The data screening device of claim 5,
wherein the data screening unit is configured to scan each component of the location information data,
wherein if the component is 0, the data screening unit is configured to delete a component of the data to be screened corresponding to the component,
wherein if the component is 1, a component of the data to be screened corresponding to the component is retained.

7. The data screening device of claim 5, wherein if the component is 1, the data screening unit is configured to delete a component of the data to be screened corresponding to the component, wherein if the component is 0, the data screening unit is configured to retain a component of the data to be screened corresponding to the component.

8. The data screening device of claim 6, wherein the data screening module further includes a structural deformation unit configured to deform a storage structure for the input data and output data.

9. The data screening device of claim 8, wherein, the structural deformation unit is configured to expand an array to a vector or to change a vector into an array.

10. The data screening device of claim 9, wherein the I/O unit is configured to transfer the output data in the output data buffer unit to the storage unit.

11. The data screening device of claim 10, wherein the data screening module further includes:
an instruction buffer unit configured to store instructions, and
a control unit configured to:
read the instructions from the instruction buffer unit, and
decode the instructions into operational microinstructions to control the data screening unit to screen acquired data.

12. The data screening device of claim 11,
wherein the storage unit is further configured to store the instructions,
wherein the I/O unit is further configured to transfer the instructions in the storage unit to the instruction buffer unit, and
wherein the data screening unit is further configured to:
receive the operational microinstructions sent by the control unit,
acquire a data address from the register unit,
serve the data transferred from the input data buffer unit as input data,
perform a screening operation on the input data, and
transfer output data to the output data buffer unit.

13. A method for data screening, comprising:
storing data by a storage unit;
storing, by a register unit, data address of data in the storage unit;
acquiring, by a data screening module, the data address from the register unit;
acquiring the data from the storage unit according to the data address,
wherein the acquired data includes location information data and data to be screened,
wherein the location information data includes one or more location components that respectively correspond to one or more components included in the data to be screened,
wherein each of the location components indicates whether a corresponding one of the one or more components in the data to be screened will be deleted; and
screening the acquired data to obtain a data screening result based on the location information data by removing at least one of the one or more components in the data to be screened that are indicated to be deleted by the location components.

14. The method for data screening of claim 13, further comprising screening, by a data screening unit, the acquired data.

15. The method for data screening of claim 13, further comprising:
transmitting, by an I/O unit, the data stored in the storage unit to an input data buffer unit,
storing, by the input data buffer unit, the data transferred by the I/O unit,
serving, by the data screening unit, the data transferred from the input data buffer unit as input data,
performing a screening operation on the input data,
transferring output data to an output data buffer unit, and
storing the output data by the output data buffer unit.

16. The method for data screening of claim 15, wherein the input data includes the data to be screened and the location information data, and wherein the output data includes the data screening result and relevant information of the data screening result.

17. The method for data screening of claim 16, wherein the data to be screened is a vector, the location information data is a binary code, a vector or an array, and the relevant information includes vector length, array size, and occupied space.

18. The method for data screening of claim 17, further comprising:
scanning, by the data screening unit, each component of the location information data,
deleting, if the component is 0, a component of the data to be screened corresponding to the component, and
retaining, if the component is 1, a component of the data to be screened corresponding to the component.

19. The method for data screening of claim 17, further comprising:
deleting, if the component is 1, a component of the data to be screened corresponding to the component, and
retaining, if the component is 0, a component of the data to be screened corresponding to the component.

20. The method for data screening of claim 18, further comprising deforming, by the structural deformation unit, a storage structure for the input data and/or output data.

21. The method for data screening of claim 20, further comprising expanding, by the structural deformation unit, an array to a vector.

22. The method for data screening of claim 21, further comprising transferring, by the I/O unit, the output data in the output data buffer unit to the storage unit.

23. The method for data screening of claim 21, further comprising:
storing instructions by the instruction buffer unit,
reading, by the control unit, the instructions from the instruction buffer unit, and
decoding the instructions into operational microinstructions to control the data screening unit to screen the acquired data.

24. The method for data screening of claim 23, further comprising
storing, by the storage unit, the instructions,
transferring, by the I/O unit, the instructions in the storage unit to the instruction buffer unit,
receiving, by the data screening unit, the operational microinstructions sent by the control unit,
acquiring, a data address from the register unit,
serving the data transferred from the input data buffer unit as input data,
performing a screening operation on the input data, and
transferring output data to the output data buffer unit.

25. The method for data screening of claim 24, further comprising:
acquiring, by the data screening unit, the address of the data to be screened and the address of the location information data from the register unit.

26. The method for data screening of claim 25, further comprising:
transmitting, by the I/O unit, the data to be screened and the location information data in the storage unit to the input data buffer unit, and
transferring, by the input data buffer unit, the data to be screened and the location information data to the data screening unit.

27. The method for data screening of claim 26, further comprising:
- screening, by the data screening unit, the data to be screened according to the location information data, and
- transferring output data to the output data buffer unit.

28. The method for data screening of claim 27, further comprising:
- determining whether or not to deform the storage structure after the I/O unit transfers the data to be screened and the location information data in the storage unit to the input data buffer data, and
- if the storage structure is required to be deformed, transferring, by the input data buffer unit, the data to be screened to the structural deformation unit, deforming the storage structure by the structural deformation unit, and transferring the deformed data to be screened back to the input data buffer unit.

29. The method for data screening of claim 27, further comprising:
- determining whether or not to deform the storage structure after the I/O unit transfers the data to be screened and the location information data in the storage unit to the input data buffer data, and
- if the storage structure is not required to be deformed, transferring, by the input data buffer unit, the data to be screened and the location information data to the data screening unit directly.

* * * * *